United States Patent [19]

Gillet

[11] Patent Number: 4,637,741

[45] Date of Patent: Jan. 20, 1987

[54] PEDAL CARRIER, IN PARTICULAR FOR A CLUTCH AND BRAKE, ON A MOTOR VEHICLE

[75] Inventor: Guy Gillet, Marines, France

[73] Assignees: Automobiles Peugeot, Paris; Automobiles Citroen, Neuilly-Sur-Seien, both of France

[21] Appl. No.: 673,368

[22] Filed: Nov. 20, 1984

[30] Foreign Application Priority Data

Nov. 23, 1983 [FR] France ................................ 83 18662

[51] Int. Cl.[4] ........................ G05G 1/14; B60K 23/02; B60T 7/06

[52] U.S. Cl. ..................................... 384/428; 384/439; 74/512; 192/12 R; 192/99 R; 192/110 R; 403/155; 403/353

[58] Field of Search ........................ 403/155, 158, 353; 192/12 R, 99 R, 99 S, 110 R; 74/512; 384/428, 438, 439, 129

[56] References Cited

U.S. PATENT DOCUMENTS

| | | | |
|---|---|---|---|
| 4,009,507 | 3/1977 | Lascarrou | 403/353 X |
| 4,136,768 | 1/1979 | Yateman et al. | 403/155 X |
| 4,192,220 | 3/1980 | Takeoka | 403/155 X |
| 4,297,550 | 10/1981 | Leighton | 74/512 X |
| 4,464,953 | 8/1984 | Tar | 192/99 S X |

FOREIGN PATENT DOCUMENTS

| | | | |
|---|---|---|---|
| 1273949 | 7/1968 | Fed. Rep. of Germany | 384/439 |
| 761292 | 3/1934 | France . | |
| 1036816 | 9/1953 | France . | |
| 2379723 | 1/1978 | France . | |
| 2062126 | 5/1981 | United Kingdom . | |

*Primary Examiner*—Stuart S. Levy
*Assistant Examiner*—David Werner
*Attorney, Agent, or Firm*—Burns, Doane, Swecker & Mathis

[57] ABSTRACT

The pedal carrier is so arranged as to permit mounting it and dismantling it in an easy manner with no use of a tool. For this purpose, each end of the pin (7) carrying the pedals is engaged in a sleeve (10,11) including a generally circular-shaped bearing surface (12) with two parallel flat portions, each bearing surface cooperating with the inner contour of an aperture (15) which has the same diameter and is provided in the side wall and communicates with the edge of this wall through a passage whose width is slightly greater than the distance between the flat portions, means being provided for immobilizing the assembly formed by the pin (7) and the sleeves (10,11) relative to the side walls (5, 6).

4 Claims, 4 Drawing Figures

FIG. 2
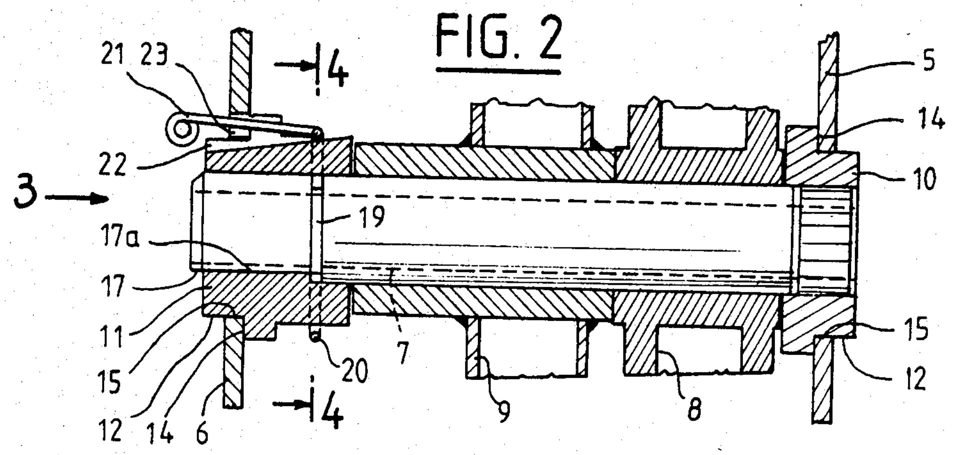
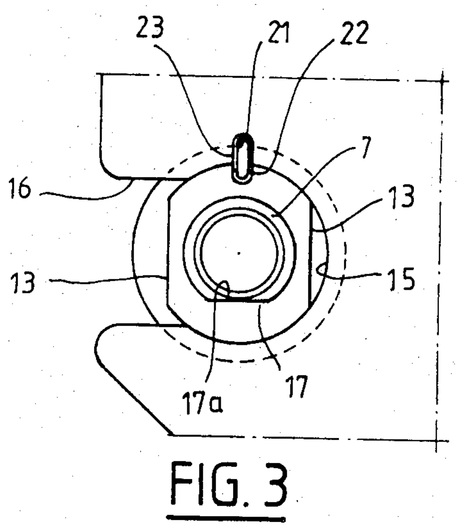
FIG. 3
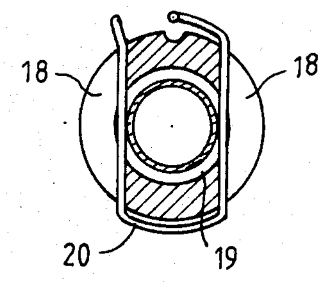
FIG. 4

PEDAL CARRIER, IN PARTICULAR FOR A CLUTCH AND BRAKE, ON A MOTOR VEHICLE

The invention relates to the mounting of control pedals, and in particular clutch and brake pedals, on a motor vehicle.

It is known that these pedals are at present pivotally mounted on a pin carried by two side walls of a support fixed to a part of the structure of the vehicle, for example the panel separating a motor compartment from the passenger compartment.

The mounting on its support of the pin carrying the pedals is usually troublesome since it must be carried out in an uncomfortable position due to its location.

An object of the invention is to render this mounting easier and more rapid by avoiding the use of any tool.

The invention therefore provides a pedal carrier device, in particular for a clutch and brake, comprising a pin carried by two side walls of a support fixed to the structure of the vehicle, wherein each end of said pin is engaged in a sleeve including a bearing surface of a generally circular shape, with two parallel flat portions, each bearing surface cooperating with the inner contour of an aperture of the same diameter formed in the side wall and connected to the edge of the side wall by a passage which has a width slightly greater than the distance between the flat portions, means being provided for immobilizing the assembly formed by the pin and the sleeves relative to the side walls.

According to other features, one end of the pin is secured to a first sleeve while the other end of the pin is freely engaged in a second sleeve, said immobilizing means comprising a first means for preventing rotation of the pin relative to the second sleeve, a second means for immobilizing in translation the pin relative to the second sleeve, a third means for immobilizing in rotation the assembly relative to the support, and a fourth means for immobilizing in translation the assembly relative to the support.

According to a particular embodiment of the invention, the first means comprises a flat portion on the pin which cooperates with a conjugate shape of the second sleeve, the second and third means are formed by a resiliently yieldable U-shaped member whose branches are simultaneously engaged in two transverse opposed recesses in the second sleeve and in a groove of the pin, said U-shaped member comprising an extension portion which is substantially parallel to the pin and resiliently engages in a notch in the side wall, this notch opening onto the aperture in which the second sleeve is engaged, and the fourth means is formed by shoulders on the sleeves which cooperate with the side walls.

An embodiment of the invention will be described in the following description with reference to the accompanying drawings:

FIG. 2 is a sectional view, to an enlarged scale, taken on line 2—2 of FIG. 1;

FIG. 3 is a view in the direction of arrow 3 of FIG. 2, and

FIG. 4 is a sectional view taken on line 4—4 of FIG. 2.

Figure 1:
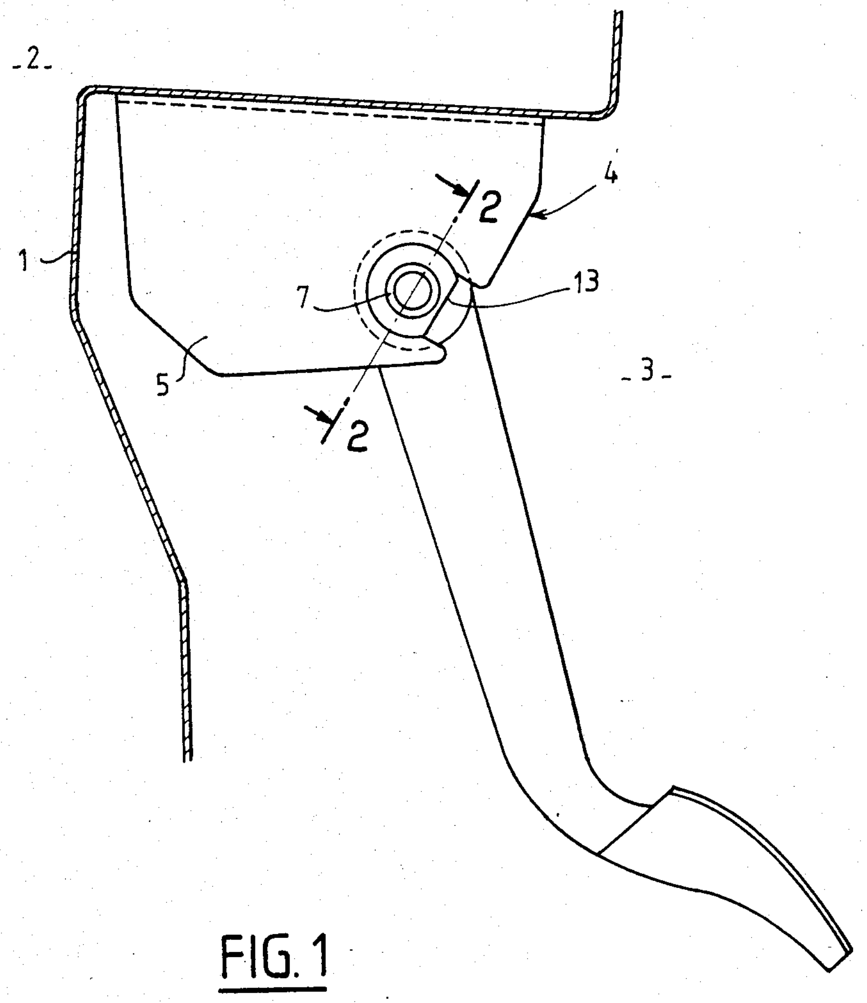
FIG. 1 is a side elevational view of the pedal carrier according to the invention.

The drawing shows a part of the panel or apron 1 of a motor vehicle separating a motor compartment 2 from a passenger compartment 3 and constituting a vehicle structure element. Fixed on this panel is a support 4 comprising two parallel side walls 5 and 6.

Disposed between these side walls in the manner described hereinunder, is a transverse pin 7 on which are pivotally mounted a clutch pedal 8 and a brake pedal 9.

Each end of the pin 7 is engaged in a sleeve 10,11 each of which comprises a bearing surface 12 of generally circular shape, with two parallel flat portions 13. This bearing surface, which is defined by a shoulder 14, cooperates with the inner contour of an aperture 15 which has the same diameter and is provided in each of the side walls 5, 6. This aperture is connected to the edge of the corresponding side wall by a passage 16 whose width is slightly greater than the distance between the two flat portions 13 but less than the diameter of the bearing surface 12.

The sleeve 10 is fixed to the pin 7, for example by a drive fit on the pin.

The sleeve 11 is freely engaged on the pin 7 which comprises, locally, a flat portion 17 cooperating with a corresponding shape **17*a*** of the inner bore of the sleeve, so as to prevent them from rotating relative to each other.

This sleeve 11 includes two transverse recesses 18 which are in opposed relation and open onto the interior of the sleeve in the region of a groove 19 formed on the pin 7.

A resiliently yieldable member 20 which has a generally U shape whose branches simultaneously engage in the recesses 18 and the groove 19, immobilizes in translation the sleeve 11 relative to the pin 7.

One of the branches of the member 20 comprises an extension portion 21 which is substantially parallel to the pin 7 and is engaged both in a radial groove 22 in the sleeve 11 and in a notch 23 which opens onto the aperture 15 of the side wall 6. This extension portion of the member 20 immobilies in rotation the assembly consisting of the pin 7 and the sleeves 10, 11 relative to the side walls 5, 6.

The operations for mounting the device just described are the following:

The pin 7 having been fixed to the sleeve 10, the clutch pedal 8 and the brake pedal 9 are engaged on this pin. After having engaged the two branches of the member 20 in the recesses 18 in the sleeve 11, the latter is slid along the pin 7 until the two branches of the member 20 resiliently engage in the groove 19 in the pin.

This pre-assembled assembly is so presented that the flat portions 13 of the bearing surfaces 12 are engaged in the passages 16 and then a rotation through a quarter of a turn of the pin causes the clipping of the extension portion 21 of the member 20 in the notch 23 of the side walls 6. The assembly comprising the pin 7, the sleeves 10, 11 is then perfectly positioned relative to the support 4, the transverse immobilization being ensured by the shoulders 14.

It can be seen that this mounting is carried out very rapidly and easily with no use of a tool.

The dismantling is carried out just as easily since it is sufficient to disengage the extension portion 21 of the member 20 from the notch 23 and then turn the pin through a quarter of a turn to permit its extraction from the support.

What is claimed is:

1. A pedal carrier device comprising a support having two spaced-apart side walls each defining an aperture, a pin carrying at least one pedal, for example a clutch or brake pedal, and disposed between said two side walls of a support, said pin having end portions, a sleeve engaged on each end portion of the pin and comprising a generally circular-shaped bearing surface including two parallel flat portions, each bearing surface being cooperative with an inner contour of a respective one of said apertures which has the same diameter and communicates with an edge of the respective side wall through a passage whose width is slightly greater than the distance between the flat portions of the respective sleeve, and means for immobilizing the assembly formed by the pin and the sleeves relative to the side walls, one end of the pin being fixed to a first sleeve of said sleeves while the other end of the pin is freely engaged in a second sleeve of said sleeves, said immobilizing means comprising a first means for immobilizing in rotation the pin relative to the second sleeve, a second means for immobilizing in translation the pin relative to the second sleeve, a third means for immobilizing in rotation said assembly relative to the support and a fourth means for immobilizing in translation said assembly relative to the support, said second means and said third means being formed by a U-shaped resilient member having branches, two transverse opposed recesses in the second sleeve, and a groove in the pin, said branches being simultaneously engaged in said two recesses, said U-shaped member including an extension portion which is substantially parallel to the pin and the respective side wall defining a notch in which notch is resiliently engaged said extension portion, said notch communicating with the aperture in which the second sleeve is engaged.

2. A pedal carrier device comprising a support having two spaced-apart side walls each defining an aperture, a pin carrying at least one pedal, for example a clutch or brake pedal, and disposed between said two side walls of a support, said pin having end portions, a sleeve engaged on each end portion of the pin and comprising a generally circular-shaped bearing surface including two parallel flat portions, each bearing surface being cooperative with an inner contour of a respective one of said apertures which has the same diameter and communicates with an edge of the respective side wall through a radially extending passage whose width is slightly greater than the distance between the flat portions of the respective sleeve, a first of said sleeves being fixed to the respective end portion of the pin, a second of said sleeves being freely mounted on the respective end portion of the pin, the device further comprising first means for immobilizing in rotation the second sleeve relative to the pin so that the first sleeve and second sleeve are prevented from relative rotation, said first means being operative irrespective of the position of the second sleeve relative to the respective side wall of the structure, second means interposed between the second sleeve and the respective side wall for holding said second sleeve in a locked position in the respective side wall in which locked position the flat portions of the second sleeve are not parallel to the passage of the respective aperture, the first sleeve assuming an identical locked position in the respective side wall, the assembly comprising the pin, the two sleeves and the at least one pedal being held in position axially of the pin relative to the two side walls by axial abutment of the sleeves between and against the respective side walls.

3. A device according to claim 2, wherein said first means comprises a flat portion on the pin and a conjugate shape of the second sleeve which is cooperative with said flat portion on the pin.

4. A device according to claim 2 wherein the second means comprises a member mounted on the second sleeve and engaging an aperture in the respective side wall, said member also being engaged in a recess in the pin so as to hold the pin in an axial position in the second sleeve and maintain the pin, the sleeves and the at least one pedal assembled in a unit before mounting the unit on said side walls.

* * * * *